UNITED STATES PATENT OFFICE.

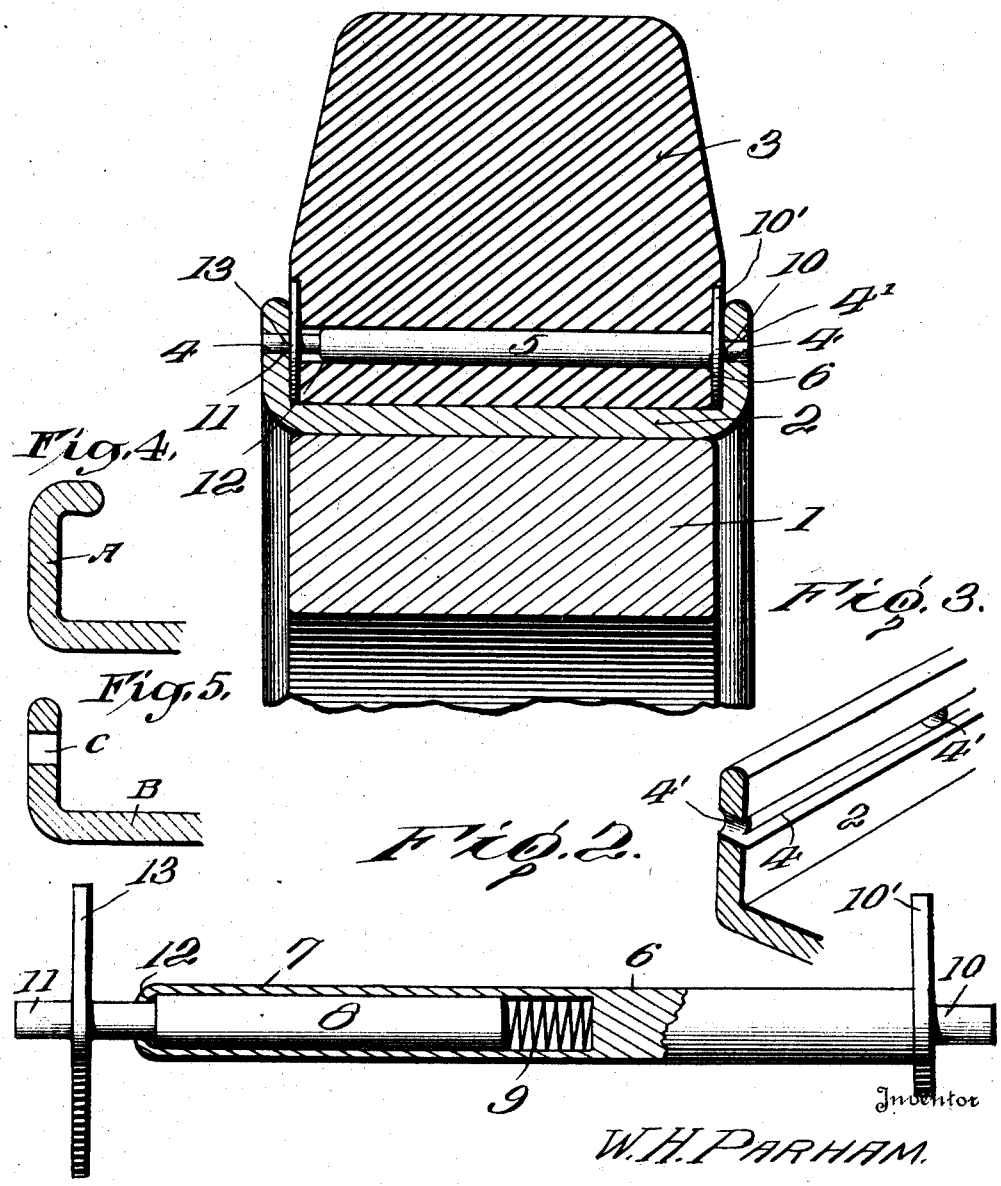

WILLIAM H. PARHAM, OF KNOXVILLE, TENNESSEE, ASSIGNOR TO PARHAM AUTO PATENTS CORPORATION, OF KNOXVILLE, TENNESSEE, A CORPORATION OF DELAWARE.

VEHICLE-TIRE FASTENER.

1,396,778.  Specification of Letters Patent.  Patented Nov. 15, 1921.

Application filed May 21, 1920. Serial No. 383,122.

*To all whom it may concern:*

Be it known that I, WILLIAM H. PARHAM, a citizen of the United States, residing at Knoxville, in the county of Knox and State of Tennessee, have invented certain new and useful Improvements in Vehicle-Tire Fasteners, of which the following is a specification, reference being had therein to the accompanying drawing.

This invention relates to a certain new and useful improvement in vehicle tire fasteners and is a companion application of my application executed of even date herewith, the object being to provide a tire fastener formed of a telescopic cross bar embedded within the base of the tire and so mounted therein that the sections can be moved in respect to one another to allow the tire to be inserted or removed from the rim.

Another object of the invention is to provide a tire fastener in which the sections of the telescoping cross bar are held in extended position by a spring so that the tire will be securely fastened in position within the rim.

A further object of the invention is to provide a tire fastener composed of a sectional cross bar having a spring for holding the sections in extended position in connection with means in the form of flanges which are engaged by the tire so that the resiliency of the tire will aid the springs in holding the sections extended into the receiving portion of the rim whereby all danger of the tire becoming displaced when in use is prevented.

Another and further object of the invention is to provide a vehicle tire fastener with means for preventing the tire from creeping by providing the tire with openings or slots into which the sectional cross bar is adapted to be held by the resiliency of the tire.

Other and further objects and advantages of the invention will be hereinafter set forth and the novel features thereof defined by the appended claims.

In the drawings,

Figure 1 is a vertical section through a portion of the wheel showing the application of my improved construction of tire fastening device thereto;

Fig. 2 is a longitudinal vertical section through the fastening device, partly in section;

Fig. 3 is a detail perspective view of a portion of the rim showing the openings to receive the cross bars for preventing the tire from creeping;

Fig. 4 is a detail section of a slightly modified form of channel rim; and

Fig. 5 is a similar view through another modified form of channel rim.

In the drawing 1 indicates a felly, 2 a channel rim and 3 a resilient tire. In the form shown the vertical walls of the channel are provided with annular grooves 4, but it is of course understood that the upper edges of the vertical legs of the channel can be turned over as shown in my companion application filed even date herewith, Serial Number 383,121 and as shown in Fig. 4 of this application, to form overhanging portions or a groove and I do not wish to limit myself to any particular construction of channel rim as I am aware that various forms of channel rims can be used in connection with my improved fastening device without departing from the spirit of my invention as it is only essential in carrying out my invention to provide a channel rim with an inwardly projecting portion under which my fastening device is adapted to extend for securing the tire in position.

In the construction of channel rim herein shown the grooves 4 formed in the vertical legs of the channel are provided with openings or slots 4' to receive the ends of the sectional cross bar in order to prevent the tire from creeping when in position thereon and while I have shown the channel rim constructed with the groove having its bottom provided with openings to receive the ends of the sectional cross bar I do not wish to limit myself to the use of a channel rim with an overhanging portion to form a groove as by forming the vertical legs of the channel with spaced openings or slots, as shown in Fig. 5, to receive the ends of the sectional cross bar the grooves can be dispensed with.

By forming the flanges of the rim with grooves having sockets to receive the ends of the fastening devices, the placing of the fastening devices within the rim is facilitated as after the tire has been compressed and forced into the rim and released the fastening devices will engage the groove even if they do not register with the openings so that the tire will be prevented from springing outwardly. The tire can then be moved so as to bring the fastening devices in alinement with the openings in order to allow the devices to be forced into the openings by the resiliency of the tire.

In applying the construction of fastening device herein shown to a solid or pneumatic tire the base is provided with a transverse bore in which the fastening device is arranged as clearly shown in Fig. 1. The fastening device comprises a sectional cross bar 5 composed of a section 6 having a tubular end 7 in which the other section 8 of the cross bar is slidably mounted, a coil spring 9 being arranged within the tubular portion beyond the end of section 8 so as to hold the section 8 in extended position and as herein shown the section 6 is provided with a reduced portion 10 adapted to fit within one of the openings or slots 4' of the grooves 4 of the channel and the section 8 with a reduced portion 11 adapted to fit within the other opening or slot 4' of the groove 4 of the channel rim so as to fasten the tire in position.

A flange 10' is formed on the section 5 of the cross bar adjacent the reduced portion 10 preferably constructed as clearly shown in the drawing so as to extend down to the base of the channel and up above the vertical wall of the same so that when an instrument is inserted or pressure is brought to bear on the same, the tire will be compressed.

The section 8 is preferably held within the section 6 by turning the edge of the tubular portion down as shown at 12 over the reduced portion so that the shoulder formed by the reduced portion provides a stop for limiting the movement of the section 8 within the section 6. The reduced portion 11 is provided with an annular enlargement or flange 13 which is of such a size that it preferably extends down to the base of the channel and up above the vertical wall of the same so that when an instrument is inserted the tire will be compressed in order to allow the same to be removed readily. The flange 13 forms a member against which a suitable instrument can be placed for forcing the section 8 within the section 6 so as to move the reduced end 11 out of the opening or slot 4' of the groove of the channel rim when it is desired to remove the tire 3 from the rim 2, it, of course, being understood that if it is necessary in inserting the tire, an instrument can be employed for compressing the section 8 and I am aware that the channel rim could be so constructed that by inserting the reduced end 10 in the groove of the channel along one edge and forcing downwardly on the tire, the movable section of the telescoping cross bar would be forced inwardly so that when the tire has been forced into position within the channel rim with the reduced portion in alinement with the groove the spring would force the same into the groove of the channel and this is also true in connection with the construction of fastening device shown in my companion application as the resiliency of the tire accomplishes the same result.

In the modification shown in Fig. 4 I have shown a channel rim A with an overhanging portion forming an annular groove adapted to receive the ends of the sectional cross bar.

In the modification shown in Fig. 5 I show a slightly modified form of channel rim B having openings C formed in its vertical legs to receive the ends of the sectional cross bar.

In this application I have shown means for preventing the tire from creeping by providing seats for the cross bar and I am aware that the construction of fastener disclosed in my companion application could be used in connection with a channel rim having seats for preventing the tire from creeping and I do not wish to limit myself to the use of any particular construction of channel rim in connection with a fastening device in the form of a sectional cross bar as I am aware that various changes in the form of channel bar can be used to accomplish my result without departing from the spirit of my invention.

While I have shown certain details of construction, I do not wish to limit myself to these details as I am aware that various changes can be made without departing from the spirit of my invention as claimed.

From the foregoing description it will be seen that I have provided a tire fastener composed of a sectional cross bar carried by a tire in such a manner that the sections are free to move in respect to one another in order to allow the tire to be inserted or removed from a channel rim.

What I claim is:—

1. In a tire fastener, the combination with a channel rim having overhanging portions, of a tire arranged within said rim, a sectional cross bar arranged within said tire and means for holding the sections of said cross bar in extended position for fastening said tire within said rim.

2. In a tire fastener for solid and cushion tires, the combination with a channel rim adapted to receive a resilient tire, said channel rim having inwardly projecting overhanging portions and a sectional cross bar embedded within the base of said tire having means for holding its ends extended under the overhanging portions of said rim for fastening said tire within said rim.

3. A fastening device for resilient tires comprising a sectional cross bar composed of two sections, one slidable within the other and a spring for holding the slidable section extended.

4. A fastening device for resilient tires in combination with a channel rim having overhanging portions comprising a resilient tire seated in said rim having a sectional cross bar composed of two sections, one slidably mounted within the other and held in extended position by a coil spring under the overhanging portions of said rim for securing said tire in said rim.

5. In a tire fastener, the combination with a channel rim having annular grooves formed in the walls of the channel, of a resilient tire arranged within said rim, a plurality of sectional cross bars embedded within said tire, each of said sectional cross bars comprising a tubular section and an inner section slidably mounted together having means for limiting the movement of the sections with respect to one another, a coil spring for holding said sections extended, said inner section having a flange adapted to receive an instrument for moving said sections in respect to one another.

6. In a tire fastener, the combination with a channel rim having openings in its vertical legs, of a tire arranged within said rim and a sectional cross bar embedded within the tire having means for holding the ends of said cross bar extended into the openings of said rim.

7. In a tire fastener for resilient tires, the combination with a chanel rim having openings in its side walls, of a resilient tire arranged within said rim having sectional cross bars arranged transversely in the base thereof, the sections of said cross bars being adapted to be extended into the openings of said rim by the resiliency of said tire.

8. A fastening device for resilient tires comprising a sectional cross bar composed of two sections, one slidable within the other adapted to be arranged transversely in the base of a resilient tire, a spring for holding said sections extended and members carried by the free ends of said sections engaged by the resilient tire for holding said ends extended.

In testimony whereof I have hereunto affixed my signature in the presence of two witnesses.

WILLIAM H. PARHAM.

Witnesses:
H. A. AURIN,
JOSEPH D. TRUAN.